United States Patent
Dixit et al.

(10) Patent No.: US 10,956,434 B2
(45) Date of Patent: Mar. 23, 2021

(54) DATA DIMENSION IMPACT ANALYSIS

(71) Applicant: SAP SE, Walldorf (DE)

(72) Inventors: Srivathsa Gunda Dixit, Bangalore (IN); Prasanna Bhat Mavinakuli, Sagar Tz. (IN); Nikita Jain, Bangalore (IN)

(73) Assignee: SAP SE, Walldorf (DE)

( * ) Notice: Subject to any disclaimer, the term of this patent is extended or adjusted under 35 U.S.C. 154(b) by 643 days.

(21) Appl. No.: 15/388,065

(22) Filed: Dec. 22, 2016

(65) Prior Publication Data
US 2018/0181619 A1 Jun. 28, 2018

(51) Int. Cl.
*G06F 16/248* (2019.01)
*G06F 16/28* (2019.01)
*G06F 16/335* (2019.01)

(52) U.S. Cl.
CPC .......... *G06F 16/248* (2019.01); *G06F 16/283* (2019.01); *G06F 16/335* (2019.01)

(58) Field of Classification Search
CPC .............. G06F 16/2465; G06F 16/212; G06F 16/24578; G06F 16/285; G06F 16/248; G06F 16/335
See application file for complete search history.

(56) References Cited

U.S. PATENT DOCUMENTS

| | | | |
|---|---|---|---|
| 7,672,935 B2 * | 3/2010 | Rowley | G06F 16/24549 707/711 |
| 2014/0156639 A1 * | 6/2014 | Shridhar | G06F 16/2462 707/722 |
| 2014/0156649 A1 * | 6/2014 | Bhattacharjee | G06F 16/24578 707/723 |
| 2014/0215093 A1 * | 7/2014 | Pasumarthi | H04L 67/306 709/246 |
| 2015/0186466 A1 * | 7/2015 | Gaza | G06F 16/24544 707/714 |

OTHER PUBLICATIONS

Sharma et al. "Classification Through Machine Learning Technique: C4.5 Algorithm based on Various Entropies", 2013, International Journal of Computer Applications, vol. 82—No. 16. (Year: 2013).*
"Applying the Distributive Property to Division or Subtraction", 2006, The Math Forum—Ask Dr. Math, mathforum.org/library/drmath/view. (Year: 2006).*

* cited by examiner

*Primary Examiner* — Sheryl L Holland
(74) *Attorney, Agent, or Firm* — Schwegman Lundberg & Woessner, P.A.

(57) ABSTRACT

Example embodiments of a system and method for analyzing and causing presentation of an impact or influence of a value of a dimension on a data set are described. In an example embodiment, a data set organized according to a first dimension is accessed from a data store. An influence value indicating an influence on the data set of at least one value of the first dimension is calculated. At least one of an influence rating and an influence ranking of the at least one value of the first dimension is determined based on the calculated influence value. The influence rating or ranking of the at least one value relative to other values of the first dimension is caused to be presented in conjunction with at least a portion of the data set organized according to the first dimension.

20 Claims, 8 Drawing Sheets

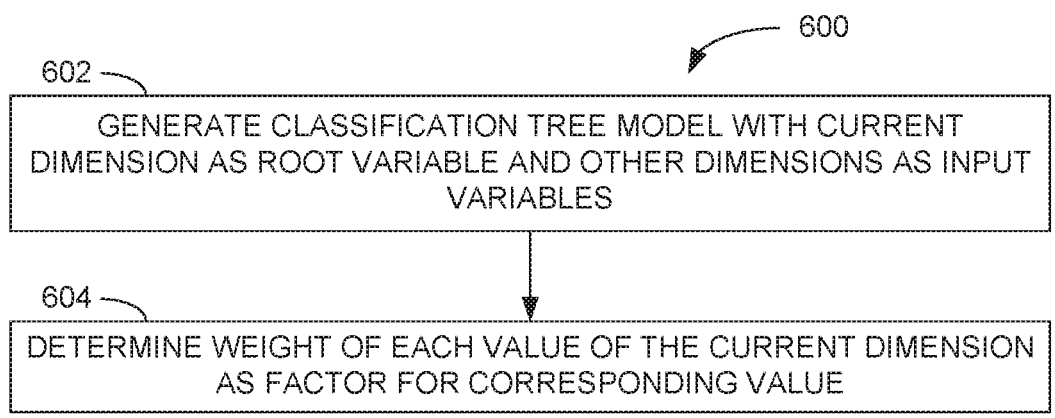
FIG. 6
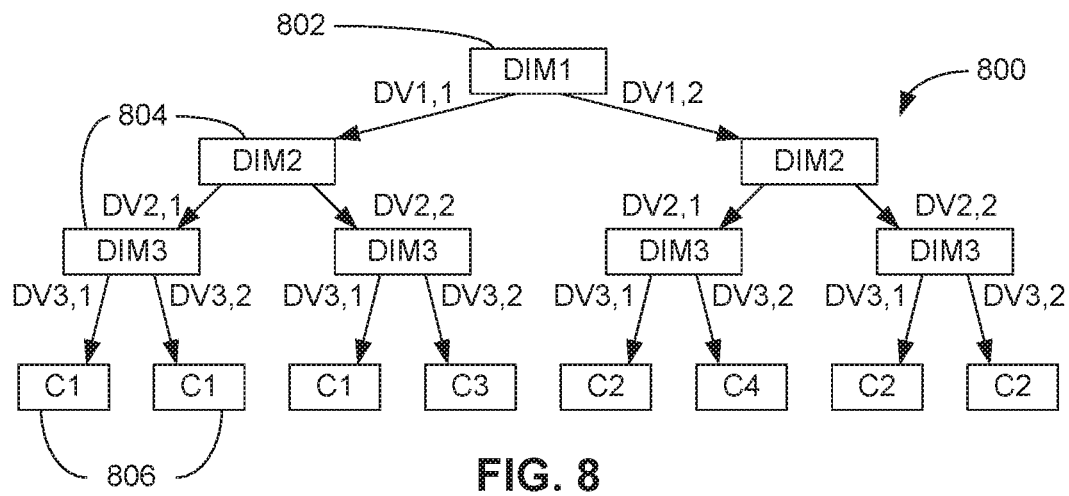
FIG. 7
FIG. 8

DATA DIMENSION IMPACT ANALYSIS

FIELD

The present application relates generally to data processing and, more specifically in an example embodiment, to determining the impact or influence of data dimension values on a data set.

BACKGROUND

The analysis of large data sets (e.g., "big data," such as data stored in a data warehouse) has become an increasingly important function for many organizations and individuals. This data may represent various aspects of a particular subject matter area, such as product or service sales or revenue, employee compensation and benefits, component procurement, employment data, organization membership, television viewership, weather data, sports statistics, and so on. Analysis of such data often includes one or more of inspection, filtering, transformation, and modeling of data to facilitate the discovery of useful information for purposes of suggesting conclusions, supporting decision-making, and the like.

A continuing trend, particular in the area of business intelligence (BI), is the customization of data analysis by a consumer of that analysis (e.g., without the aid of an information technology expert). For example, a sales manager may want to determine which product of an array of products sold by his organization has the greatest impact on total revenue or profit. To that end, the sales manager may access a tool that allows the manager to vary how the data are processed and/or filtered, how the results are presented, and so on that may affect the overall data analysis. Due to the size or nature of the data set involved, however, the consumer of the data may not be able to determine which dimensions (e.g., data partitioning structures for categorizing facts or measures, such as according to people, product, place, time, etc.), individual data measures, or other portions of the data set have the greatest impact on the overall results indicated by the data set without either intimate knowledge of the data set itself or of the tool being used to analyze the data.

BRIEF DESCRIPTION OF DRAWINGS

The present disclosure is illustrated by way of example and not limitation in the figures of the accompanying drawings, in which like reference numbers indicate similar elements.

FIG. 6 is a flow diagram of an example method of employing a classification tree model to determine a factor of an influence value for a dimension value.

FIG. 7 is a data set indicating various combinations of values of various dimensions with corresponding measures and classifications.

FIG. 8 is a classification tree model exemplifying the data set of FIG. 7.

DETAILED DESCRIPTION

In the following description, for purposes of explanation, numerous specific details are set forth to provide an understanding of various example embodiments of the present subject matter. It will be evident, however, to those skilled in the art, that example embodiments of the present subject matter may be practiced without these specific details.

Figure 1:
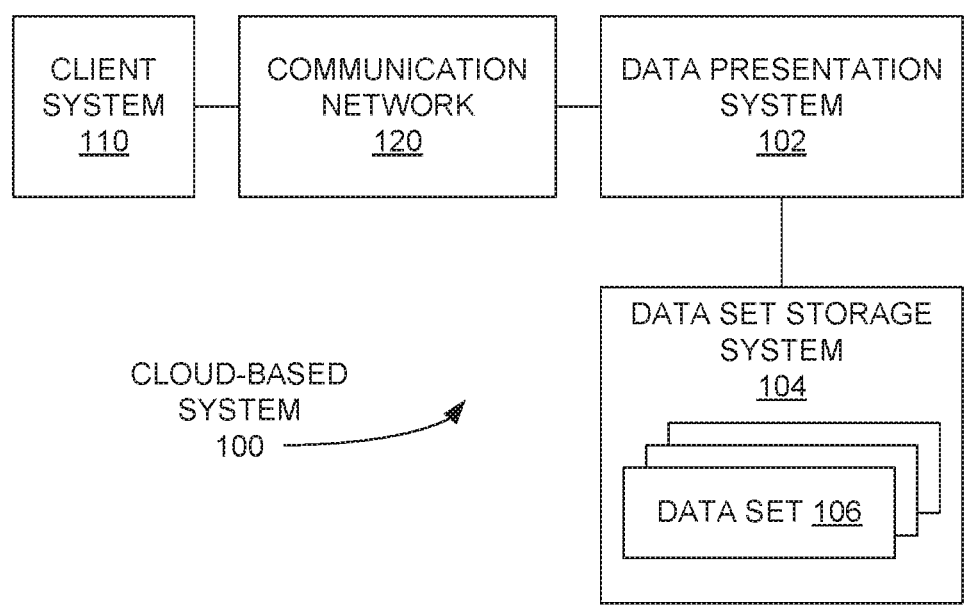
FIG. 1 is a block diagram of an example cloud-based system.

FIG. 1 is a block diagram of an example cloud-based system 100 in which a client system 110 accesses a data presentation system 102 by way of a communication network 120, such as a wide area network (WAN) (e.g., the Internet), a wireless WAN (WWAN), a local area network (LAN), a wireless LAN (WLAN), a cellular data network (e.g., a third-generation (3G) or fourth-generation (4G) network), another communication connection, and/or combinations thereof. The client system 110, the data presentation system 102, or both may be responsible for executing at least some portion of an application in which a user interface (e.g., a graphical user interface (GUI)) is presented to a user of the client system 110 to facilitate presentation of one or more data sets 106 stored in a data set storage system 104 to the user. In one example, the data presentation system 102 executes a server-side application, while the client system 110 provides the user of the client system 110 an interface by which to interact with the server-side application, such as by way of a web browser application (e.g., by way of HyperText Transfer Protocol (HTTP)), a dedicated client application facilitating communication via an application programming interface (API) with the application executing on the data presentation system 102, or other means. While a single client system 110 is depicted as being in communication with the data presentation system 102, multiple such client systems 110 may be communicatively coupled with the data presentation system 102 via the communication network 120 in other embodiments.

In an example embodiment, the data set storage system 104 may be a data warehouse, database, or other type of data storage system in which one or more data sets 106 are stored for subsequent retrieval and/or analysis via the data presentation system 102. In an example embodiment, the data set storage system 104 may include one or more data storage devices or systems for storing the data sets 106, including, but not limited to, nonvolatile data storage devices (e.g., magnetic disk drives, optical disk drives, and/or flash memory), and possibly volatile data storage devices (e.g., dynamic random access memory (DRAM) devices, static random access memory (SRAM) devices, and so on). In an example embodiment, the data set storage system 104 may include one or more processors, controllers, or the like to receive storage, updating, and retrieval commands via the data presentation system 102 and to access the data sets 106 in accordance with the received commands.

The data sets 106 stored in the data set storage system 104 may include business data, scientific data, sports data, and/or any other kind of data that may be organized along one or more dimensions. A dimension, as the term is used herein, is a data structure that is used to organize or categorize portions of a data set to enable data analysis, such as that found in business intelligence (BI) systems. Examples of dimensions include date, geography, people, products, and the like. For example, sales data may be may be organized according to year, so that sales of one year (e.g., 2014) may be compared against sales of the following year (2015). Moreover, a dimension may be hierarchical such that the data sets 106 may be organized in a more granular manner, such as by year, month, week, and day. Similar hierarchies may be used for geography (e.g., country, state, county, and so on), people (e.g., gender, age, and like), products (e.g., manufacturer, product line, individual product, etc.), and many other types of dimensions.

Additionally, each dimension includes a plurality of dimension values specifying particular members of the dimension. For example, a time dimension organized according to months of a particular year may have dimension values of "January," "February," and so on. Similarly, a geographic dimension organized by country may include dimension values of "United States," "India," "Japan," and so forth.

The data presentation system 102 may be configured to receive requests from the client system 110 to present one or more data sets 106, or one or more portions thereof, via the client system 110 to a user. In response to those requests, the data presentation system 102 may retrieve the requested portions of the data sets 106 from the data set storage system 104 and transmit the requested data via the communication network 120 to the client system 110. In an example embodiment, the data presentation system 102 may also present the requested data in a particular visual format (e.g., via a GUI) specified by the data presentation system 102, the user (e.g., via the client system 110), and/or another party.

In some example embodiments, the client system 110 may be a desktop computer, a laptop computer, a tablet computer, a smart phone, or any other communication device configured to generate requests for one or more data sets 106, or portions thereof, as well as receive the requested data and present that data via a display device (e.g., display monitor, touch screen, or the like) to the user.

In example embodiments described in greater detail below, the data presentation system 102 may also determine the impact or influence of one or more values of one or more dimensions of the data set 106 relative to other dimension values of the data set 106, and cause the presentation of a rating or ranking of that influence to the user via the client device 110. For example, an expert in education may want to analyze a data set 106 directed to the literacy rate of different states in the United States. In analyzing the data, the expert, as a user or consumer of the data set 106, may want to determine how much one or more of fifty individual states of the United States contributes to the overall literacy rate in the U.S., as well as the contribution of each state relative to the other states to that rate, so that educational efforts may be concentrated in particular states to increase the overall rate.

In another example, an executive of a retail chain including hundreds of retail outlets may want to determine how each of a plurality of factors influences purchasing decisions at each of the outlets, thereby impacting or influencing the overall revenue of the retail chain. By determining which factors have the most impact, the executive may be able to focus the efforts of the retail chain to improving the overall revenue of the chain. In yet another example, an analysis of the impact or contribution of each product sold by the outlets to the overall revenue of the retail chain may allow the executive to focus marketing efforts on those products that affect the overall revenue the most.

To address each of these examples, as well as many others, the data presentation system 102, when called upon by a user to present one or more data sets 106 (e.g., by way of opening a workspace or document configured to present a data set 106 of the data set storage system 104), may automatically determine an influence or impact of one or more dimension values of the data set 106 relative to other dimension values of the data set 106, such as by way of generating an impact or influence rating and/or ranking for each of the dimension values. In some example embodiments, the data presentation system 102 may allow the user to select a particular dimension value (e.g., a particular month, or a particular store) and present detailed information regarding the influence of that particular dimension value to view the effect of that modification on the data set. In other example embodiments, the data presentation system 102 may allow the user to modify one or more data set 106 values to visualize the resulting effect on other values of the data set 106 based on the determined or calculated influence of the various dimension values. Other aspects regarding various example embodiments of the data presentation system 102 are discussed in greater detail below.

Figure 2:
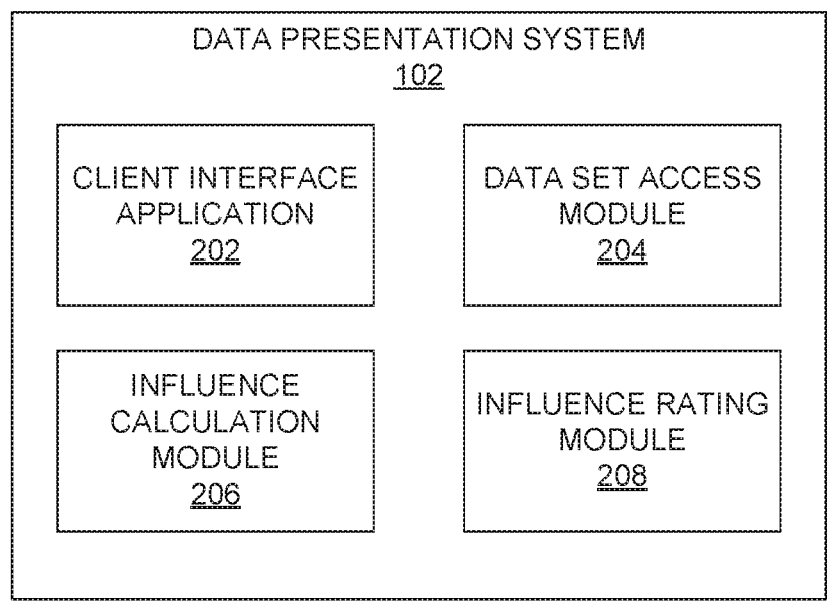
FIG. 2 is a block diagram of an example data presentation system of the example cloud-based system of FIG. 1.

FIG. 2 is a block diagram of an example embodiment of the data presentation system 102 of the cloud-based system 100 of FIG. 1. Shown within the data presentation system 102 are several components or modules, including a client interface application 202, a data set access module 204, an influence calculation module 206, and an influence rating module 208. Other components or modules not explicitly discussed herein may be included in the data presentation system 102 in other embodiments. In other example embodiments, one or more of the modules 202-208 may be omitted, or may be combined with other modules 202-208. In an example embodiment, one or more of the modules 202-208 may be hardware circuitry, one or more hardware processors (e.g., a central processing unit (CPU), a graphical processing using (GPU), and/or the like) executing instructions stored in a memory, or some combination thereof. Moreover, while the example embodiments herein place the modules 202-208 within the data presentation system 102, other example embodiments may locate one or more of the modules 202-208 or associated functionality in the client system 110, possibly along with the data set storage system 104.

In an example embodiment, the client interface application 202 may be configured to present one or more data sets 106, or portions thereof, for viewing by a user via the client device 110. In an example embodiment, the client interface application 202 may be a business intelligence (BI) program that presents data sets 106 (e.g., in relation to one or more dimensions) in one or more forms (e.g., tables, pie charts, bar graphs, etc.) for viewing by a user. An example of such a program may be Viz™ by SAP® SE of Walldorf, Germany, which presents data sets 106 in various formats, such as individual data "visualizations," or in data "stories" that may include multiple visualizations. However, many other types of client interface applications 202 may be employed in other example embodiments.

To provide the data from one or more data sets 106, the data presentation system 102 may employ a data set access module 204 configured to access the one or more data sets 106 stored in the data set storage system 104. In an example embodiment, the data set access module 204 may be a database access module, a data warehouse access module, or another type of access module configured to provide commands corresponding to the type of data set storage system 104 being employed in the cloud-based system 100.

In example embodiments described herein, the client interface application 202 may also be configured to provide an indication of an influence or impact rating or ranking of one or more dimension values on data values or measures of interest to the user. To that end, the data presentation system 102 may include an influence calculation module 206 configured to generate a numeric value indicating a level of impact or influence over a particular type of data of the data set 106. In an example embodiment, the influence calculation module 206 may generate an influence value for each dimension value (e.g., January, February, etc.) of a dimension (e.g., month) of the portion of the data set 106 to be presented to the user.

In addition, the data presentation system 102 may include an influence rating module 208 configured to assign an influence rating and/or ranking to each of one or more dimension values of the same or different dimensions based on its corresponding influence value. In an example embodiment, an influence ranking may include, for example, an ordinal number ranking the influence of the corresponding dimension value relative to the influence of other dimension values based on their corresponding influence values. In other example embodiment, an influence rating may include, for example, a rating from 1 to some maximum number (e.g., 5, 10, etc.) that exemplifies a relative influence of each dimension value compared to other dimension values.

Figure 3A:
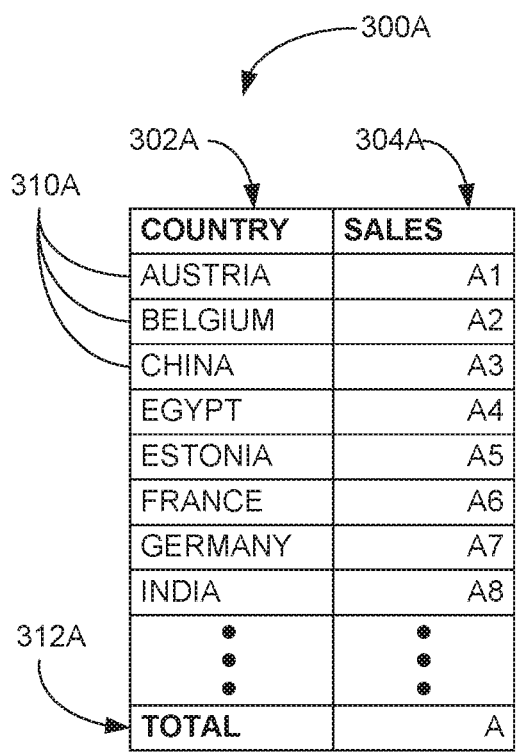
FIG. 3A is a graphical representation of a data set organized according to a country dimension.
Figure 3B:
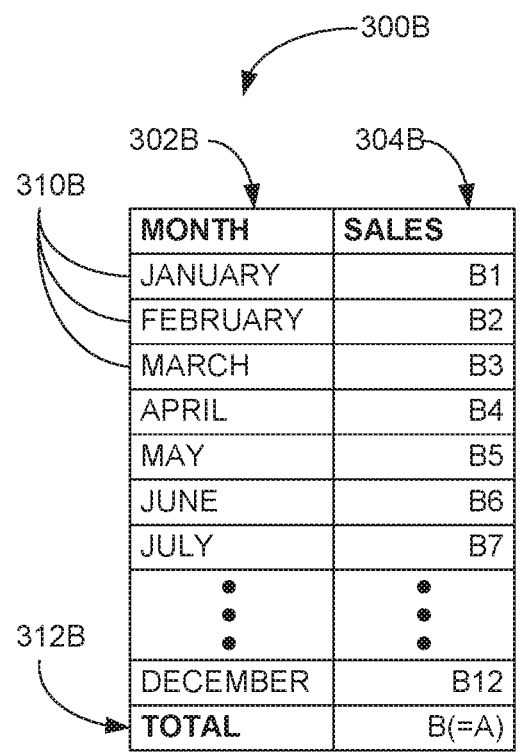
FIG. 3B is a graphical representation of a data set organized according to a time (e.g., month) dimension.

FIGS. 3A and 3B are graphical representations of data sets 300 organized according to a particular dimension 302. More specifically, FIG. 3A provides a data set 300A indicating an amount of sales 304A for each of a number of countries 310A of a geographic dimension 302A, along with a sales total 312A. FIG. 3B is a graphical representation of a data set 302B indicating an amount of sales 304B for each month 310B of a particular year dimension 302B, as well as a sales total 312B for that year. In an example embodiment, the information presented in the data sets 300A, 300B may be from the same data set 106, which may result in the sales total 312A equaling the sales total 312B. Consequently, the data presentation system 102 may rate and/or rank one or more dimension values 310A, 310B of either or both of the displayed dimensions 302A, 302B.

Figure 4:
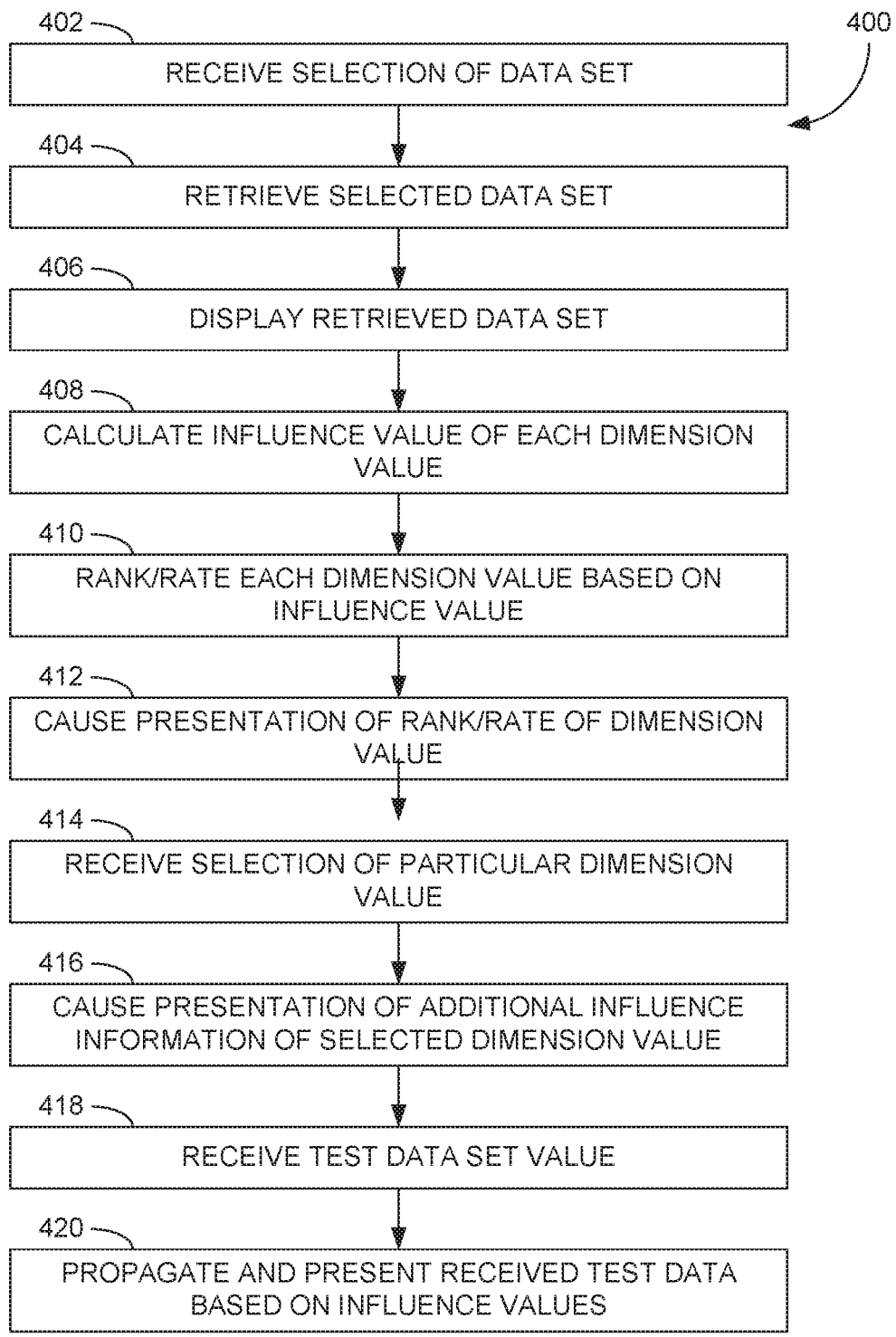
FIG. 4 is a flow diagram of an example method of determining, and causing presentation of, an influence or impact of a value of a dimension of a data set.

FIG. 4 is a flow diagram of an example method 400 for determining, and causing presentation of, an influence or impact of a value 310 of a dimension 302 of a data set 106. While the method 400 is described in various example embodiments below as being performed by the data presentation system 102, other modules or systems, such as the client device 110 of FIG. 1, may perform the method 400, or some portion thereof, in other example embodiments.

In the method 400, the data presentation system 102 (e.g., via the client interface application 202) may receive a selection of a data set 106 (operation 402), or a portion thereof, or multiple data sets 106, from the client device 110 via the communication network 120. In response to the selection, the data presentation system 102 may retrieve the selected data set 106 from the data set storage system 104 (e.g., via the data set access module 204) (operation 404). The client interface application 202 may then cause the retrieved data set 106 to be presented to the user (operation 406), such as by transmitting the data set 106 in a numerical, tabular, graphical, or other format via the communication network 120 to the client device 110, at which the data set 106 may be presented to the user via a display device.

In example embodiments, the data presentation system 102 (e.g., via the influence calculation module 206) may calculate an influence value for each dimension value 310 of one or more dimensions 302 of the data set 106 (operation 408). Further, in some example embodiments, the data presentation system 102 (e.g., via the influence rating module 208) may generate a ranking and/or rating of the influence of one or more dimension values 310 of the one or more dimensions 302 (operation 410) and cause presentation of the ranking and/or rating information (operation 412) (e.g., in conjunction with the presentation of the retrieved data set 106). Details regarding calculation of the influence values in some example embodiments is provided below in conjunction with FIGS. 5-10.

In an example embodiment, the data presentation system 102 (e.g., via the client interface application 202) may also receive a selection of a particular dimension value 310 (operation 414) from the client device 110. In response, the data presentation system 102 may cause presentation of additional influence information (e.g., the calculated influence value and one or more factors employed to calculate the influence value) for the selected dimension value 310 (operation 416), as calculated via the influence calculation module 206.

In another example embodiment, the data presentation system 102 (e.g., via the client interface application 202) may receive a test or proposed value for one or more values or measures of the data set 106 (operation 418). In response, the data presentation system 102 (e.g., via the influence calculation module 206) may propagate the test value through other values or measures of the data set 106 based on the calculated influence values of the dimension values 310 of the one or more dimensions 302 (operation 420).

While the particular operations 402-420 of the method 400 of FIG. 4, as well as the operations of other methods described below, are depicted as being performed in a particular order, other orders of operation, including simultaneous or concurrent execution of two or more of the operations 402-420, are also possible in some embodiments.

Figure 5:
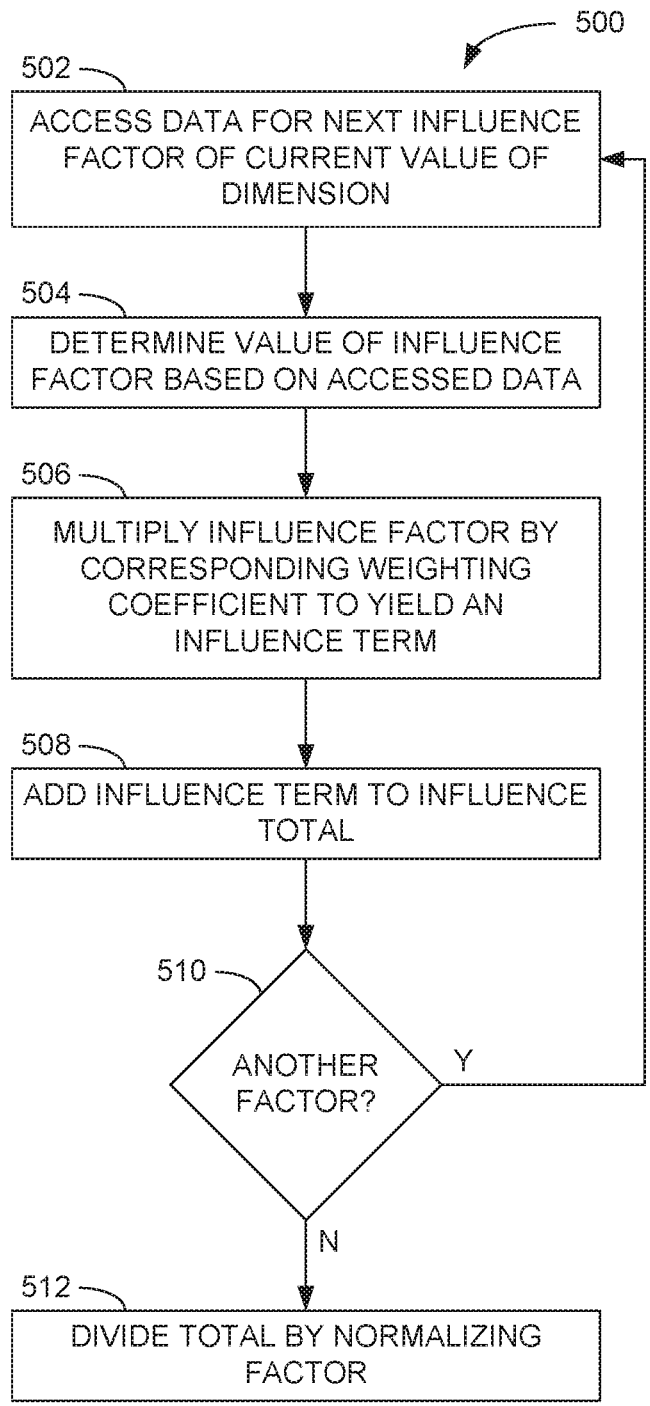
FIG. 5 is a flow diagram of an example method of calculating an influence value for a dimension value.

FIG. 5 is a flow diagram of an example method 500 of calculating an influence value for a dimension value 310 of a dimension 302. In an example embodiment, the influence value of a dimension value 310 on the data set 106 may be based on any number of factors, such as how the dimension value 310 affects the numerical values or measures of the data set 106, how the dimension value 310 affects the presentation of the data set 106 to the user (e.g., by use of the dimension value 310 as a filter or formatting factor in the presentation of the data set 106), how the dimension value 310 is used in selecting other data to be merged or appended to the data set 106, and so on. In some example embodiments, a numerical value may represent each such factor. Further, one or more of these factors may be weighted by way of a corresponding coefficient before being summed to determine an overall influence value of the particular dimension value 310 on the data set 106.

In the method 500, as may be executed by the influence calculation module 206, data may be accessed that is pertinent to an influence factor in calculating the influence value for one or more dimension values 310 (operation 502). A value for the influence factor may then be determined based on the accessed data (operation 504). The determined value may then be multiplied by corresponding weighting coefficient (operation 506) to yield an influence term, and the influence term may be added to an influence total (operation 508). If more influence factors remain to be processed (operation 510), operations 502-508 are executed for each such influence factor. In some example embodiments, the resulting influence total, after all influence factors are included, may be divided by a normalizing factor (operation 512) or other divisor to produce the influence value for the corresponding dimension value 310. This process may be repeated for each dimension value 310 of one or more dimensions 302 of the data set 106.

In an example embodiment in which eight factors are considered in determining the impact or influence of a particular dimension value 310, the overall calculated impact or influence value for that dimension value 310 may be as follows:

$$F(x)=(f(n1*k1)+f(n2*k2)+f(n3*k3)+f(n4*k4)+f(n5*k5)+f(n6*k6)+f(n7*k7)+f(n8*k8))/d$$

In this example, $F(x)$ is the overall calculated influence value, kx is a calculated or determined value for one of the influence factors involved in determining the influence value, nx is the associated weighting coefficient for that particular factor to yield an influence term, $f(nx*kx)$ may be a scaling function, normalizing function, or other type of function applied to an influence term, and d may be a normalizing factor or other type of factor by which to divide the sum of weighted terms to yield the overall influence value $F(x)$. In one example embodiment, the normalizing factor d may be an integer (e.g., 5), but many other values for the normalizing factor d are also possible. While this particular influence function employs eight factors, other influence functions may employ any number of factors (e.g., from one to greater than eight).

FIG. 6 is a flow diagram of an example method 600 of employing a classification tree model to determine a factor of an influence value for a dimension value 310. In the method 600, the influence calculation module 206 may generate a classification tree model (operation 602) associated with the dimension value 310. In an example embodiment, the classification tree model may employ the dimension 302 of the current dimension value 310 as a root node or variable, and one or more other dimensions 302 as other input nodes or variables, with the classification tree including a number of classifications for the various measures of the data set 106 as leaf nodes.

Based on a weight associated with each leaf node of the classification tree model, a weight for one or more dimension values 310 of the dimension 302 serving as the root node of the classification tree model may be determined (operation 604), with the determined weight being used as a factor of the influence value described above with respect to FIG. 5. In an example embodiment, the weight of each leaf node is represented by the number of measures of the data set 106 falling within the classification represented by the corresponding leaf node.

FIG. 7 is a data set 700 indicating various combinations of dimension values 710 of various dimensions 702, 704, 706 with corresponding measures 708 and classifications 720. In this particular simplified example, each of dimension 702 (DIM1), dimension 704 (DIM2), and dimension 706 (DIM3) have two possible dimension values 710 each (e.g., DV1,1 and DV1,2 for DIM1; DV2,1 and DV2,2 for DIM2; and DV3,1 and DV3,2 for DIM3). For each possible combination of dimension values 710, the data set 106 provides a measure 708 (e.g., an amount of sales) for the corresponding dimension values 710 (e.g., a particular geographic area for DIM1, a particular time frame for DIM2, and a particular product for DIM3). In addition, each of the measures 708 may be classified in a particular classification 720 C1-C4. In an example embodiment, each classification 720 may represent a range of values for the measure 708 (e.g., "high," "high average," "low average," and "low"). In example embodiments, these classifications may be determined by the user, the data presentation system 102, or another system or person.

Based on the data set 700, a corresponding classification tree model 800 may be generated, as illustrated in FIG. 8. In the classification tree model 800, the first dimension DIM1 is employed as the root node 802, the second dimension DIM2 and the third dimension DIM3 are other input nodes 804, and the leaf nodes 806 represent the classifications 720 C1-C4. As shown in FIG. 8, a value for DIM1 of DV1,1; a value for DIM2 of DV2,1; and a value for DIM3 of DV2 results in a classification of C1. In an example embodiment, the classification tree model 800 of FIG. 8 may be simplified in cases where a value of a particular dimension 702, 704, 706 does not affect the resulting classification 720 of the associated data. For example, if DIM1 is DV1,1 and DIM2 is DV2,1, either value of DIM3 (DV3,1 or DV3,2) results in classification C1. Thus, the associated portion of the classification tree model 800 may be removed, with a value of DV2, 1 for DIM2 indicating a resulting classification of C2 with a corresponding weight of two.

Using either the data set 700 or the associated classification tree model 800, the influence calculation module 206 may determine a weight for each dimension value DV1,1 and DV1,2 of DIM1 associated with each classification 720. In this example embodiment, the weight of the first value DV1,1 of DIM1 for classification C1 is three, while the weight of the second value DV2,2 of DIM1 for classification C1 is zero. Other weights for the various dimension values 710 relative to each classification 720 may be derived in a similar manner. The weights for each dimension value 710 may be combined (e.g., summed, averaged, etc.) to yield an overall weight for an influence factor (e.g., k1) for that dimension value 710.

In an example embodiment, the corresponding coefficient (e.g., n1) may be 10000, although other coefficients n1 are also possible.

Figure 9:
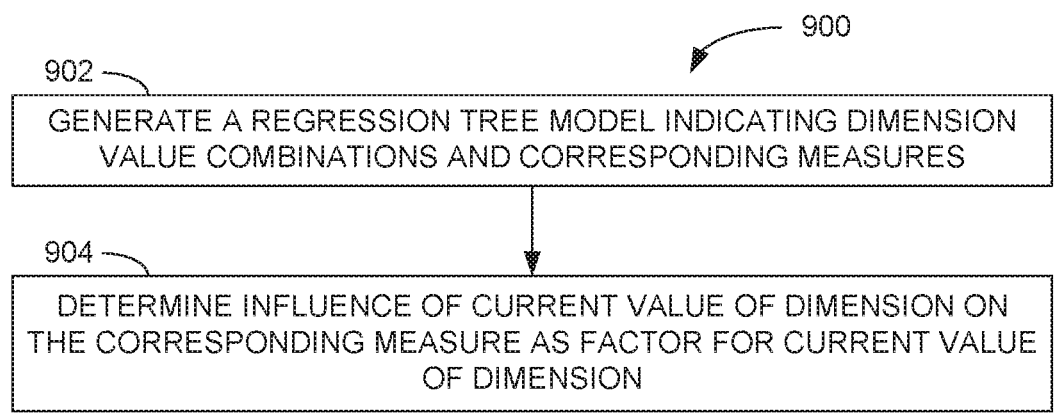
FIG. 9 is a flow diagram of an example method of employing a regression tree model to determine a factor of an influence value for a dimension value.

FIG. 9 is a flow diagram of an example method 900 of employing a regression tree model to determine another factor of an influence value for a dimension value 310 of a dimension 302. In the method 900, a regression tree model indicating combinations of dimension values 310 and corresponding measures of the data set 106 is generated (operation 902). Based on the regression tree model, an influence factor for each dimension value 310 indicating the influence of the dimension value 310 on the corresponding measure of the data set 106 may be determined (operation 904).

Figure 10:
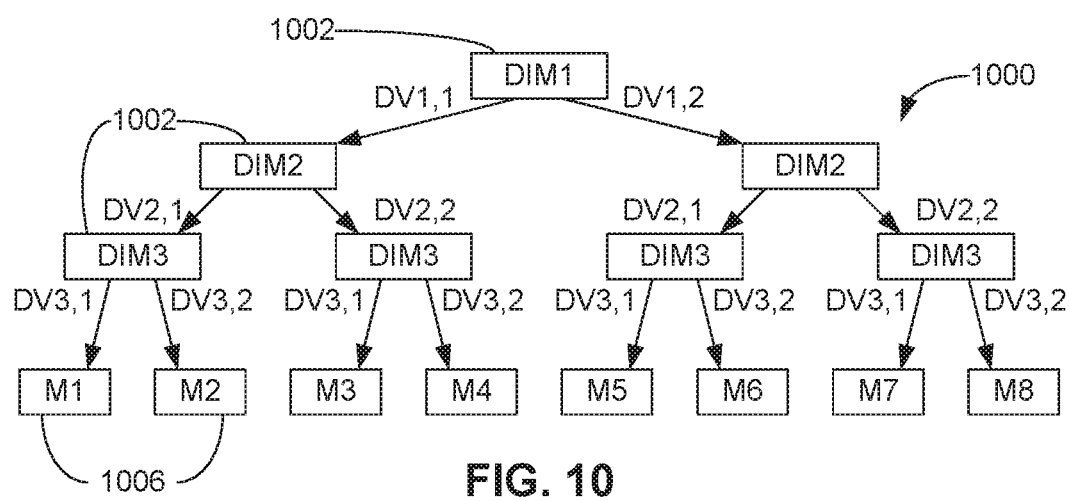
FIG. 10 is a regression tree model exemplifying the data set of FIG. 7.

FIG. 10 is a regression tree model 1000 exemplifying the data set 700 of FIG. 7. In this example embodiment, the dimension 702 being analyzed (e.g., DIM1) may again serve as a root node 1002 and the other dimensions 704, 706 (e.g., DIM2 and DIM3) may serve as other input nodes 1004, although other examples are also possible. In this example embodiment, the leaf nodes 1006 represent particular measures 708 instead of classifications 720. Similar to the case described above with the classification tree model 800, the regression tree model 1000 may be simplified relative to that shown in FIG. 10, as some of the resulting measures 708 (e.g., M1 and M2) may be the same, or nearly so. Based on the resulting regression tree model 1000, the effect of each dimension value 710 combination (e.g., DV1,1 of DIM1; DV2,1 on DIM2; and DV3,1 of DIM3) on its corresponding measure 708 may be taken into account to determine the weight of a particular dimension value 710 on each measure 708. The weights for each dimension value 710 may then be combined (e.g., summed, averaged, or the like) to yield an influence factor (e.g., k2) for the overall influence value to be calculated.

In an example embodiment, the corresponding coefficient (e.g., n2) may be 9000, although other coefficients n2 are also possible.

In an example embodiment, another factor (e.g., k3) may be the number of conditional visual formatting operations (e.g., underlining, italicizing, bolding, different font color, etc.) for presenting values of the data set 106 to the user, such as those employed in a worksheet or document presented by the data presentation system 102 that are based on the particular dimension value 310 that is being rated and/or ranked. In one example embodiment, the corresponding coefficient n3 may be 5000, although other coefficients n3 are also possible.

In another example embodiment, another factor (e.g., k4) may be the number of data filters for calculating and/or presenting one or more aspects of the data set 106 to the user that are based on the particular dimension value 310 that is being rated and/or ranked. In one example embodiment, the corresponding coefficient n4 may be 3000, although other coefficients n4 are also possible.

Also in an example embodiment, another factor (e.g., k5) may be the number of times the particular dimension value 310 is presented to the user (e.g., in a data "visualization" (e.g., a particular data format in which data of the data set 106 is to be presented, such as a table, bar graph, pie chart, or the like) or a data "story" (e.g., a user interface in which multiple data visualizations may be displayed on a single page or screen)). In one example embodiment, the corresponding coefficient n5 may be 2000, although other coefficients n5 are also possible.

In the example embodiment, another factor (e.g., k6) may be the number of times a calculation or presentation filter is employed on the dimension value 310 in a data set 106 presented to the user. In one example embodiment, the corresponding coefficient n6 may be 1000, although other coefficients n6 are also possible.

Further in an example embodiment, another factor (e.g., k7) may be the number of times that the particular dimension value 310 is employed to merge or append data sets 106, such as from multiple database tables of the data set storage system 104. In one example embodiment, the corresponding coefficient n7 may be 100, although other coefficients n7 are also possible.

In another example embodiment, another factor (e.g., k8) may be the number of different dimension 302 hierarchies within which the particular dimension value 310 is represented. For example, a geographic dimension 302 may include the particular hierarchical levels of nation, state, county, and city/town. Other types of well-known dimension hierarchies (e.g., based on time, location, product, and so on), as well as more customized (e.g., user-defined) dimension hierarchies, in which the particular dimension value 310 may be represented may also be counted. In one example embodiment, the corresponding coefficient n8 may be 10, although other coefficients n8 are also possible.

Consequently, application of the various aspects of the example embodiments discussed herein may provide a method of generating a quantifiable value representing the impact or influence of one or more dimensions 302 or included dimension values 310 of a data set 106, and of using that value to automatically provide an indication to the user of the relative influence or importance of those dimension values 310 within the data set 106 to the user, thus enhancing the analytical value of the data set 106.

In an example embodiment, a system comprises one or more hardware processors and a memory storing instructions that, when executed by at least one of the one or more hardware processors, cause the system to perform operations comprising accessing, from a data store, a data set organized according to a first dimension; calculating an influence value indicating an influence, on the data set, of at least one value of the first dimension; determining at least one of an influence rating and an influence ranking of the at least one value of the first dimension based on the calculated influence value; and causing, via a display device, presentation of the at least one of an influence rating and an influence ranking of the at least one value of the first dimension relative to other values of the first dimension in conjunction with a presentation of at least a portion of the data set organized according to the first dimension.

In another example embodiment, including all previous example embodiments, the calculating of the influence value comprises determining each of a plurality of factors indicating a type of influence, on the data set, of the at least one value of the first dimension; multiplying, for each of the plurality of factors, the factor by a corresponding coefficient to yield a corresponding influence term; and summing the corresponding influence terms.

In another example embodiment, including all previous example embodiments, the calculating of the influence value further comprises dividing the summed corresponding influence terms to produce the influence value.

In another example embodiment, including all previous example embodiments, the calculating of the influence value comprises generating, for the at least one value of the first dimension, at least one classification tree model; and determining, for the at least one classification tree model, a weight of the at least one value of the first dimension, the influence value being based on the weight.

In another example embodiment, including all previous example embodiments, a target variable of the at least one classification tree model comprises a classification of a group of measures of the data set.

In another example embodiment, including all previous example embodiments, a root node of the at least one classification tree model comprises the first dimension.

In another example embodiment, including all previous example embodiments, the data set is organized according to a plurality of dimensions comprising the first dimension, an input variable of the at least one classification tree comprising a second dimension of the plurality of dimensions.

In another example embodiment, including all previous example embodiments, the calculating of the influence value comprises generating a regression tree model indicating an influence of the at least one value of the first dimension on each of a plurality of measures of the data set, the influence value being based on the regression tree model.

In another example embodiment, including all previous example embodiments, the calculating of the influence value comprises determining a number of times at least one conditional visual format is applied to the at least one value of the first dimension, the influence value being based on the number of times the at least one conditional visual format is applied to the at least one value of the first dimension.

In another example embodiment, including all previous example embodiments, the calculating of the influence value comprises determining a number of presentation filters being based on the at least one value of the first dimension, the influence value being based on the number of presentation filters.

In another example embodiment, including all previous example embodiments, the calculating of the influence value comprises determining a number of times the at least one value of the first dimension is employed in one or more data set visualizations to be presented to a user, the influence value being based on the number of times the at least one value of the first dimension is employed in the one or more data set visualizations.

In another example embodiment, including all previous example embodiments, the calculating of the influence value comprises determining a number of times the at least one value of the first dimension is employed in one or more user interface pages to be presented to a user, the influence value being based on the number of times the at least one value of the first dimension is employed in the one or more user interface pages.

In another example embodiment, including all previous example embodiments, the calculating of the influence value comprises determining a number of times the at least one value of the first dimension is employed to merge a plurality of data tables of the data set, the influence value being based on the number of times the at least one value of the first dimension is employed to merge the plurality of data tables of the data set.

In another example embodiment, including all previous example embodiments, the calculating of the influence value comprises determining a number of times the at least one value of the first dimension is employed in one or more geographic dimension hierarchies of the data set, the influence value being based on the number of times the at least one value of the first dimension is employed in the one or more geographic dimension hierarchies of the data set.

In another example embodiment, including all previous example embodiments, the calculating of the influence value comprises determining a number of times the at least one value of the first dimension is employed in one or more user-defined dimension hierarchies of the data set, the influence value being based on the number of times the at least one value of the first dimension is employed in the one or more user-defined dimension hierarchies of the data set.

In another example embodiment, including all previous example embodiments, the operations further comprise receiving a user selection of one of the at least one value of the first dimension; and causing, via the display device, presentation of an indication of at least one factor of a plurality of numerical factors upon which the influence rating of the selected one of the at least one value of the first dimension is based.

In another example embodiment, including all previous example embodiments, the first dimension comprises a geographic dimension.

In another example embodiment, including all previous example embodiments, the system further comprises a communication network interface configured to communicate via a communication network with a client device, the client device comprising the display device.

In an example embodiment, a method comprises accessing, from a data store, a data set organized according to a first dimension; calculating, using at least one hardware processor of a machine, an influence value indicating an influence, on the data set, of at least one value of the first dimension; determining at least one of an influence rating and an influence ranking of the at least one value of the first dimension based on the calculated influence value; and causing, via a display device, presentation of the at least one of an influence rating and an influence ranking of the at least one value of the first dimension relative to other values of the first dimension in conjunction with a presentation of at least a portion of the data set organized according to the first dimension.

In an example embodiment, a non-transitory computer-readable storage medium storing instructions that, when executed by one or more processors of a machine, cause the machine to perform operations comprising accessing, from a data store, a data set organized according to a first dimension; calculating an influence value indicating an influence, on the data set, of at least one value of the first dimension; determining at least one of an influence rating and an influence ranking of the at least one value of the first dimension based on the calculated influence value; and causing, via a display device, presentation of the at least one of an influence rating and an influence ranking of the at least one value of the first dimension relative to other values of the first dimension in conjunction with a presentation of at least a portion of the data set organized according to the first dimension.

Figure 11:
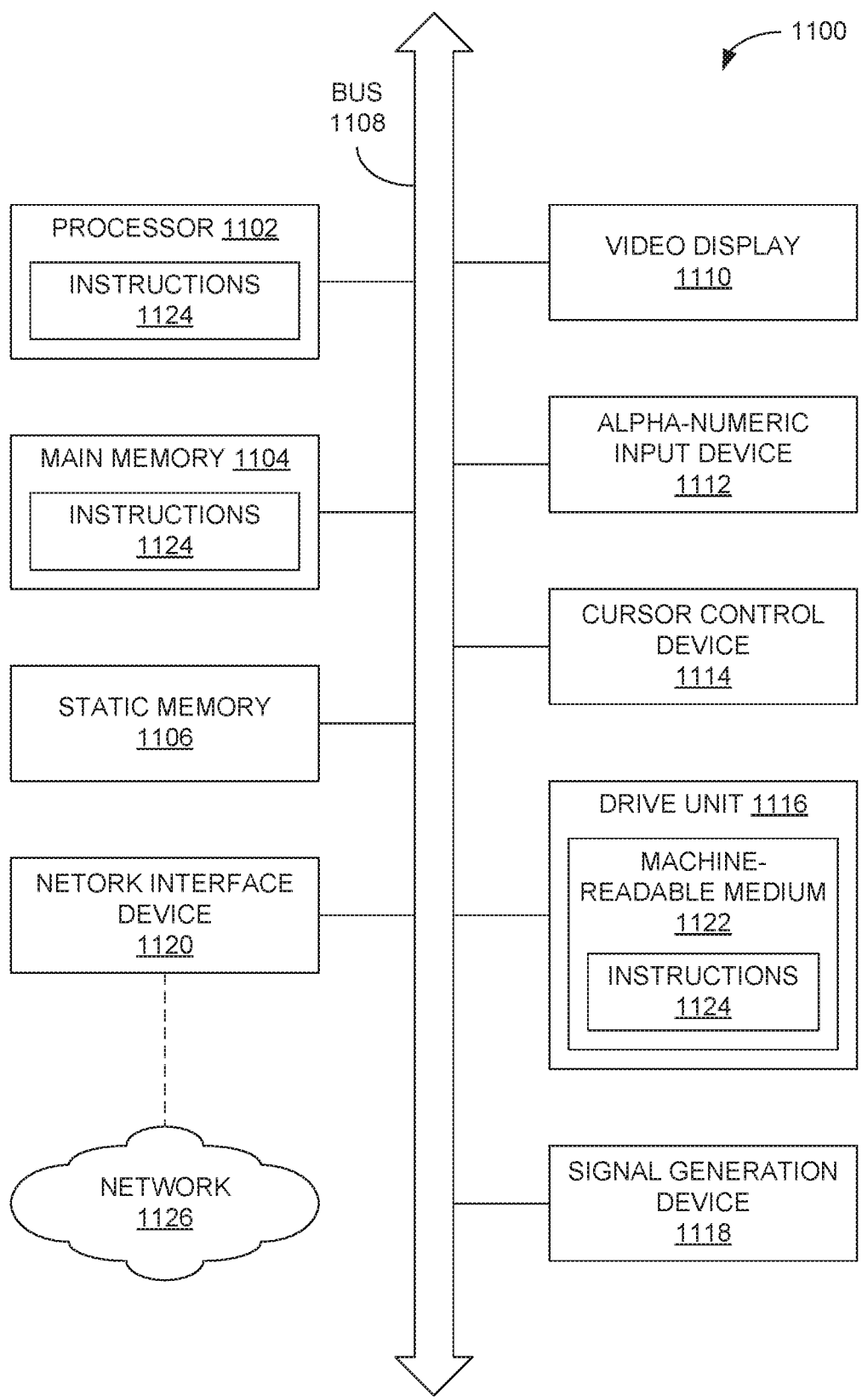
FIG. 11 is a block diagram of a computer processing system within which a set of instructions may be executed for causing a computer to perform any one or more of the methodologies discussed herein.

FIG. 11 is a block diagram of a computer processing system 1100 within which a set of instructions 1124 may be executed for causing a computer to perform any one or more of the methodologies discussed herein, such as those discussed in conjunction with FIGS. 4-10, as well as other methodologies discussed herein. In some embodiments, the computer operates as a standalone device or may be connected (e.g., networked) to other computers. In a networked deployment, the computer may operate in the capacity of a server or a client computer in a server-client network environment, or as a peer computer in a peer-to-peer (or distributed) network environment. Moreover, the computer processing system 1100 may serve in example embodiments as, for example, the data presentation system 102 of FIGS. 1 and 2, as well as any component or module 202-208 described therewith.

In addition to being sold or licensed via traditional channels, embodiments may also be deployed, for example, by software-as-a-service (SaaS) providers, application service providers (ASPs), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 1100 includes a processor 1102 (e.g., a central processing unit (CPU), a graphics processing unit (GPU), or both), a main memory 1104, and a static memory 1106, which communicate with each other via a bus 1108. The computer processing system 1100 may further include a video display 1110 (e.g., a plasma display, a liquid crystal display (LCD), or a cathode ray tube (CRT)). The computer processing system 1100 also includes an alphanumeric input device 1112 (e.g., a keyboard), a user interface (UI) cursor control device 1114 (e.g., a mouse and/or touch screen), a drive unit 1116, a signal generation device 1118 (e.g., a speaker), and a network interface device 1120.

The drive unit 1116 includes a machine-readable medium 1122 on which is stored one or more sets of instructions 1124 and data structures embodying or utilized by any one or more of the methodologies or functions described herein. The instructions 1124 may also reside, completely or at least partially, within the main memory 1104, the static memory 1106, and/or the processor 1102 during execution thereof by the computer processing system 1100, with the main memory 1104, the static memory 1106, and the processor 1102 also constituting tangible machine-readable media 1122.

The instructions 1124 may further be transmitted or received over a network 1126 via the network interface device 1120 utilizing any one of a number of well-known transfer protocols (e.g., Hypertext Transfer Protocol).

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions 1124. The term "machine-readable medium" shall also be taken to include any medium that is capable of storing, encoding, or carrying a set of instructions 1124 for execution by the computer and that cause the computer to perform any one or more of the methodologies of the present application, or that is capable of storing, encoding, or carrying data structures utilized by or associated with such a set of instructions 1124. The term "machine-readable medium" shall accordingly be taken to include, but not be limited to, solid-state memories, optical and magnetic media, and other non-transitory media.

While the example embodiments discussed herein are described with reference to various implementations and exploitations, these example embodiments are illustrative, and the scope of the disclosure is not so limited. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are possible and may fall within a scope of various embodiments of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements fall within a scope of embodiments of the present disclosure as represented by the appended claims.

What is claimed is:

1. A system comprising:
    one or more hardware processors; and
    a memory storing instructions that, when executed by at least one of the one or more hardware processors, cause the system to perform operations comprising:
    retrieving, from a data store, a data set organized according to a first dimension;
    calculating an influence value indicating an influence, on the data set, of a dimension value of the first dimension, the calculating of the influence value based on one or more factors, the one or more factors determined by employing at least one classification tree model, the one or more factors including an effect of the dimension value on a measure of the data set;
    determining at least one of an influence rating and an influence ranking of the dimension value of the first dimension based on the calculated influence value, the at least one of the influence rating and the influence ranking providing a ranking or a rating of the dimension value relative to one or more other values of the data set;
    causing, via a display device, presentation of the at least one of the influence rating and the influence ranking of the dimension value of the first dimension relative to the one or more other values of the retrieved data set in conjunction with a presentation of at least a portion of the retrieved data set; and
    allowing modification of the dimension value to visualize, an effect of the modification on the one or more other values of the retrieved data set based on the influence dimension value.

2. The system of claim 1, the calculating of the influence value comprising:
    multiplying, for each of the one or more factors, the factor by a corresponding coefficient to yield a corresponding influence term; and
    summing the corresponding influence terms.

3. The system of claim 2, the calculating of the influence value further comprising: dividing the summed corresponding influence terms to produce the influence value.

4. The system of claim 1, the operations further comprising:
    generating, for the dimension value of the first dimension, the at least one classification tree model; and
    determining, based on a weight associated with each leaf node of the at least one classification tree model, each of the one or more factors.

5. The system of claim 4, wherein a target variable of the at least one classification tree model comprises a classification of a group of measures of the data set, the group of measures including the measure of the data set.

6. The system of claim 4, wherein a root node of the at least one classification tree model comprises the first dimension.

7. The system of claim 4, wherein the data set is organized according to a plurality of dimensions comprising the first dimension and an input variable of the at least one classification tree comprises a second dimension of the plurality of dimensions.

8. The system of claim 1, the operations further comprising: employing a regression tree model to determine an additional factor of the influence value.

9. The system of claim 1, the calculating of the influence value comprising: determining a number of times at least one conditional visual format is applied to the dimension value of the first dimension.

10. The system of claim 1, the calculating of the influence value comprising: determining a number of presentation filters being based on the dimension value of the first dimension, the influence value being based on the number of presentation filters.

11. The system of claim 1, the calculating of the influence value comprising: determining a number of times the dimension value of the first dimension is employed in one or more data set visualizations to be presented to a user, the influence value being based on the number of times the dimension value of the first dimension is employed in the one or more data set visualizations.

12. The system of claim 1, the calculating of the influence value comprising: determining a number of times the dimension value of the first dimension is employed to merge a plurality of data tables of the data set, the influence value being based on the number of times the dimension value of the first dimension is employed to merge the plurality of data tables of the data set.

13. The system of claim 1, the calculating of the influence value comprising: determining a number of times the dimension value of the first dimension is employed in one or more geographic dimension hierarchies of the data set, the influence value being based on the number of times the dimension value of the first dimension is employed in the one or more geographic dimension hierarchies of the data set.

14. The system of claim 1, the calculating of the influence value comprising: determining a number of times the dimension value of the first dimension is employed in one or more user-defined dimension hierarchies of the data set, the influence value being based on the number of times the dimension value of the first dimension is employed in the one or more user-defined dimension hierarchies of the data set.

15. The system of claim 1, the operations further comprising:
receiving a user selection of one of the dimension value of the first dimension; and
causing, via the display device, presentation of an indication of at least one factor of a plurality of numerical factors upon which the influence rating of the selected one of the dimension value of the first dimension is based.

16. The system of claim 1, the first dimension comprising a geographic dimension.

17. The system of claim 1, the system further comprising: a communication network interface configured to communicate via a communication network with a client device, the client device comprising the display device.

18. The system of claim 1, the calculating of the influence value comprising: determining a number of times the dimension value of the first dimension is employed in one or more user interface pages to be presented to a user, the influence value being based on the number of times the dimension value of the first dimension is employed in the one or more user interface pages.

19. A method comprising:
retrieving from a data store, a data set organized according to a first dimension;
calculating, using at least one hardware processor of a machine, an influence value indicating an influence of a dimension value of the first dimension, the calculating of the influence value based on one or more factors, the one or more factors determined by employing at least one classification tree model, the one or more factors including an effect of the dimension value on a measure of the data set;
determining at least one of an influence rating and an influence ranking of the dimension value of the first dimension based on the calculated influence value, the at least one of the influence rating and the influence ranking providing a ranking or a rating of the dimension value relative to one or more other values of the data set;
causing, via a display device, presentation of the at least one of the influence rating and the influence ranking of the dimension value of the first dimension relative to the one or more other values of the retrieved data set in conjunction with a presentation of at least a portion of the retrieved data set; and
allowing modification of the dimension value to visualize an effect of the modification on the one or more other values of the retrieved data set based on the influence dimension value.

20. A non-transitory computer-readable storage medium storing instructions that, when executed by one or more processors of a machine, cause the machine to perform operations comprising:
retrieving, from a data store, a data set organized according to a first dimension;
calculating an influence value indicating an influence, on the data set, of a dimension value of the first dimension, the calculating of the influence value based on one or more factors, the one or more factors determined by employing at least one classification tree model, the one or more factors including an effect of the dimension value on a measure of the data set;
determining at least one of an influence rating and an influence ranking of the dimension value of the first dimension based on the calculated influence value, the at least one of the influence rating and the influence ranking providing a ranking or a rating of the dimension value relative to one or more other values of the data set; and
causing, via a display device, presentation of the at least one of the influence rating and the influence ranking of the dimension value of the first dimension relative to the one or more other values of the retrieved data set in conjunction with a presentation of at least a portion of the retrieved data set; and
allowing modification of the dimension value to visualize an effect of the modification on the one or more other values of the retrieved data set based on the influence dimension value.

* * * * *